Sept. 25, 1934.   A. SOMOGYI   1,974,548
PROCESS FOR THE PRODUCTION OF RUBBER TOYS
Filed July 11, 1933
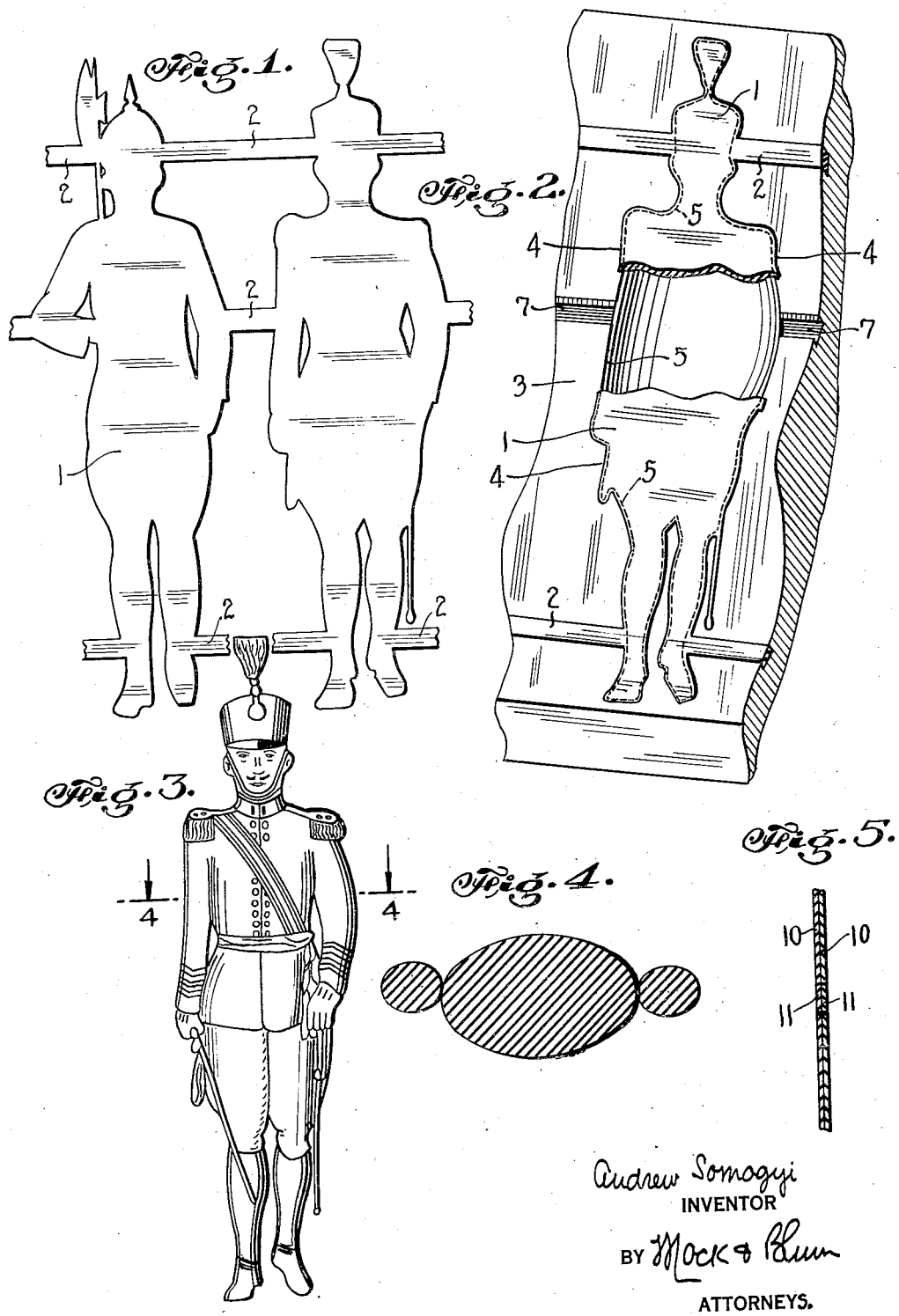
Andrew Somogyi
INVENTOR
BY Mock & Blum
ATTORNEYS.

Patented Sept. 25, 1934

1,974,548

UNITED STATES PATENT OFFICE 1,974,548

PROCESS FOR THE PRODUCTION OF RUBBER TOYS

Andrew Somogyi, Budapest, Hungary, assignor to Magyar Ruggyantáarugyar Részvénytársaság, Budapest, Hungary Application July 11, 1933, Serial No. 679,848
In Hungary July 13, 1932

16 Claims. (Cl. 18—55)

This invention relates to a process for the production of rubber toys, and more particularly to sets of rubber toys consisting of a plurality of different figures.

The individual pieces of the known sets of rubber toys consisting of several independent figures have hitherto been produced one by one. Such rubber toys are produced either by combining several figures of pleasing appearance which is expensive or they are produced in a plain manner in order to reduce the consequent high cost of production.

An object of this invention is to provide for a more simple and cheaper production of the aforesaid rubber toy sets consisting of several figures of pleasant execution and good quality.

According to the process of this invention for the production of rubber toy sets consisting of a plurality of figures such as groups of soldiers, football teams, menageries and the like, a piece of raw or only slightly vulcanized rubber, consisting of equal or differently shaped and sized parts which are connected at one or more points or by small surfaces, is cut out and placed in a mold after vulcanization, or if desired, after further finishing such as painting or varnishing, the toy set is divided into a plurality of figures by cutting off the connecting parts.

If, as is generally required, the figures are to be subjected to a further treatment such as for example painting and varnishing, it is advisable to effect the cutting subsequent to the partial or total finishing instead of after vulcanization. The cutting places, if necessary, may be patched by cementing thereon small sheets of rubber, by brushing with a rubber solution or by any other known manner. Examples of the methods of carrying out the process according to the invention are described hereinafter with the aid of the accompanying drawing in which:

Fig. 1 is a plain view of a cut out rubber sheet,
Fig. 2 is a perspective view of the mould,
Fig. 3 is a front elevation of the rubber toy,
Fig. 4 is a section on lines 4—4 of an individual figure of Fig. 3 and
Fig. 5 is a longitudinal section of two superimposed rubber sheets.

Example 1.—From a compact raw rubber sheet mixed with the usual additional substances a rubber piece consisting of five parts, such as illustrated by the numeral 1 in the drawing and which are connected with each other by portions 2 is cut out by stamping, as shown in Fig. 1. This piece is put on the back part of the pressure mould 3 as shown in Fig. 2, in such manner that the edges 4 of the cut out parts cover or even overlap the grooves 5 of the said pressure mould and the connecting portions 2 lie in the connecting grooves 7. The mould and sheet prepared in this manner are covered with the cover plate or front part of the pressure mould. The grooves on the cover plate have the same outline as the corresponding parts of the pressure mould. They may however in accordance with the figure to be produced, also differ in detail if desired within said outline. The material is then vulcanized in known manner in the press. During vulcanization the cavities of the moulds are completely filled by the rubber sheet and the protruding excess is removed after vulcanization by cutting off. The rubber toy obtained in this manner is shown in Fig. 3.

Example 2.—A piece of rubber similar to that described in Example 1 is cut out from a rubber sheet, which besides the usual compounding ingredients is also mixed with an inflating substance such as ammonium carbonate. In this case the parts 1 are considerably smaller than the grooves of the mould and the connecting pieces are somewhat longer than the connecting grooves of the mould so that when placing into the mould, the pieces 1 lie in the grooves of the mould and the connecting pieces in the corresponding connecting grooves of the mould. After placing on the cover plate vulcanization is effected in the press. During vulcanization the rubber swells to a sponge owing to the action of the inflating material, completely fills the cavities of the mould, whereby no substantial amount of the softened rubber is pressed out. The clean cutting of the rubber piece taken from the mould is in general unnecessary; the separation of the individual figures is made in the manner described in Example 1. Prior to the separation painting and varnishing may be effected; subsequently the places at which the figures are cut are treated with a rubber solution.

Example 3.—From two superimposed rather thin rubber sheets a rubber piece similar to that described in Example 1, which consists of several spaced pieces 10 (Fig. 5) connected to each other at parts 11, is cut out, and either simultaneously with or after the cutting an inflating material such as a mixture of ammonium chloride and sodium nitrate is injected into the hollow parts formed between the spaced pieces 10 whereupon the piece of rubber is placed in a mould similar to that described in Example 2, i. e. into a mould which possesses grooves similar to those of the hollow parts. Thereafter the article is vulcanized in known manner in the press and the vulcanized piece is, prior to or after further finishing, divided into its elements by cutting off the connecting parts.

*Example 4.*—The procedure is as in Example 3, except that channels in the parts 11 connecting the cavities are provided and after cutting, the openings obtained in this way are provided with whistles in known manner.

Having now particularly described and ascertained the nature of my said invention and in what manner the same is to be performed, I declare that what I claim is:

1. A process for the production of rubber toy sets consisting of a plurality of figures, such as groups of soldiers, football teams, menageries and the like which comprises cutting out from a piece of rubber a plurality of parts connected with each other, vulcanizing said piece of rubber and then dividing the same into a plurality of figures by cutting off the connecting parts.

2. The process of claim 1 in which the starting material is a piece of raw rubber.

3. The process of claim 1 in which the starting material is a piece of slightly vulcanized rubber.

4. The process of claim 1 in which the plurality of parts cut from the piece of rubber are equally shaped and sized.

5. The process of claim 1 in which the plurality of parts cut from the piece of rubber are differently shaped and sized.

6. The process of claim 1 in which the plurality of parts are connected at one point.

7. The process of claim 1 in which the plurality of parts are connected at a plurality of points.

8. The process of claim 1 in which the plurality of parts are connected by small surfaces.

9. The process of claim 1 in which the rubber, after vulcanization, is further finished by painting, varnishing and the like.

10. The process of claim 1 in which the places produced by the cuttings are treated with a rubber solution.

11. A process for the production of rubber toy sets consisting of a plurality of figures, such as groups of soldiers, football teams, menageries and the like which comprises cutting out from rubber sheeting having admixed therewith an inflating substance a plurality of figures connected with each other, vulcanizing these forms in moulds in which the grooves are smaller than those of the cut out rubber pieces which are to fit in said grooves, and then dividing the resultant figures by cutting off the connecting parts.

12. The process of claim 11 in which the inflating agent is ammonium carbonate.

13. A process for the production of rubber toy sets consisting of a plurality of figures, such as groups of soldiers, football teams, menageries and the like which comprises cutting out from two superimposed rubber sheets, connected by compact rubber parts, a plurality of figures connected with each other, filling the cavities between said rubber sheets with an inflating substance, vulcanizing the resultant product and then dividing the same into a plurality of figures by cutting off the parts connecting the figures.

14. The process of claim 13 in which the inflating substance is a mixture of ammonium chloride and sodium nitrate.

15. The process of claim 13 wherein channels are provided in the compact rubber parts.

16. The process of claim 13 wherein the openings obtained when cutting out the individual figures are provided with whistles in a known manner.

ANDREW SOMOGYI.